United States Patent [19]

Tawel

[11] Patent Number: 5,298,796
[45] Date of Patent: Mar. 29, 1994

[54] NONVOLATILE PROGRAMMABLE NEURAL NETWORK SYNAPTIC ARRAY

[75] Inventor: Raoul Tawel, Glendale, Calif.

[73] Assignee: The United States of America as represented by the Administrator of the National Aeronautics and Space Administration, Washington, D.C.

[21] Appl. No.: 912,956

[22] Filed: Jul. 8, 1992

[51] Int. Cl.$^5$ ............................................. H03K 19/08
[52] U.S. Cl. ..................................... 307/201; 395/24; 395/25; 257/323
[58] Field of Search ....................... 307/201, 448, 450; 395/24, 25; 257/319, 323

[56] References Cited

U.S. PATENT DOCUMENTS

| | | | |
|---|---|---|---|
| 4,336,465 | 6/1982 | Nakano et al. | 307/450 |
| 4,904,881 | 2/1990 | Castro | 307/201 |
| 4,942,450 | 7/1990 | Iwashita | 257/323 |
| 4,950,917 | 8/1990 | Holler et al. | 307/201 |
| 4,978,873 | 12/1990 | Shoemaker | 307/498 |
| 5,021,693 | 6/1991 | Shima | 307/494 |
| 5,028,810 | 7/1991 | Castro et al. | 307/201 |
| 5,055,897 | 10/1991 | Canepa et al. | 307/201 |

OTHER PUBLICATIONS

Rosetto et al. "Analog VLSI Synaptic Matrices", *IEEE Micro*, Dec. 1989, pp. 56–63.
K. Bult and H. Wallinga, "A CMOS Four-Quadrant Analog Multiplier," IEEE Journal of Solid State Circuits, vol. SC-21, No. 3, pp. 430–435, 1986.
J. Alspector and R. Allen, "A Neuromorphic VLSI Learning System," Proc. of the 1987 Stanford Conference, Advanced Research in VLSI, pp. 313–349.
S. Eberhardt, T. Duong, and A. Thakoor, "A VLSI Analog Synapse 'Building-Block' Chip for Hardware Neural Network Implementations," Proceedings of the Third Annual parallel Processing Symposium, Fullerton, Ca., Mar. 29–31, 1989.
M. Holler, S. Tam, H. Castro and R. Benson, "An Electrically Trainable Artificial Neural Network (ETANN) with 10240 'Floating Gate' Synapses," (Preprint).
D. Kerns, J. Tanner, M. Sivilotti and J. Luo, "CMOS UV-Writable Non-Volatile Analog Storage," (To appear in the Proceedings of Advanced Research in VLSI: International Conference 1991, Santa Cruz, Ca.
C. Mead and L. Conway, *Introduction to VLSI Systems*, Addison-Welsey Publishing Co. (1980), pp. 38–45.
J. Babanezhad and C. Gabor, "A 20-V Four Quadrant CMOS Analog Multiplier," IEEE Journal of Solid State Circuits, vol. SC-20, No. 6, Dec. 1985 pp. 1158–1168.

*Primary Examiner*—Edward P. Westin
*Assistant Examiner*—Jon Santamauro
*Attorney, Agent, or Firm*—John H. Kusmiss; Thomas H. Jones; Guy M. Miller

[57] ABSTRACT

A floating-gate MOS transistor is implemented for use as a nonvolatile analog storage element of a synaptic cell used to implement an array of processing synaptic cells based on a four-quadrant analog multiplier requiring both X and Y differential inputs, where one Y input is UV programmable. These nonvolatile synaptic cells are disclosed fully connected in a 32×32 synaptic cell array using standard VLSI CMOS technology.

3 Claims, 4 Drawing Sheets

NONVOLATILE PROGRAMMABLE NEURAL NETWORK SYNAPTIC ARRAY

ORIGIN OF INVENTION

The invention described herein was made in the performance of work under a NASA contract, and is subject to the provisions of Public Law 96-517 (35 USC 202) in which the contractor has elected not to retain title.

TECHNICAL FIELD

The invention relates to a programmable neural network synaptic array and more particularly to a VLSI CMOS analog circuit for implementing an array of simple processing synaptic elements based on a four-quadrant analog multiplier circuit requiring differential inputs (X,Y), where one input is UV programmable on a floating-gate MOS nonvolatile charge-storage element.

BACKGROUND ART

Analog hardware systems are emerging as an important class of computing devices for neural network implementations. However, one of the major needs currently facing neural network researchers remains the nonvolatile synaptic storage of analog synaptic weights. (J. Alspector, et al., "A Neuromorphic VLSI Learning System," Proceedings of the 1987 Stanford Conference, Advanced Research in VLSI, pp. 313-349, 1987.)

A nonvolatile synaptic cell can be made significantly more compact than other "volatile" synaptic cells, such as, for example, those based on a capacitor refresh scheme. (S. Eberhardt, T. Duong, A. Thakoor, "A VLSI Analog Synapse Building-Block Chip for Hardware Neural Network Implementations," Proceedings of the Third Annual Parallel Processing Symposium, Fullerton, CA, Mar. 29-31, 1989.) From a practical point of view, both the on-chip and off-chip download and interface circuitry should be considerably simplified.

The fully analog nature of simplified synaptic cell circuits should make them ideal for implementation of on-chip learning systems. Moreover, once learning has been achieved, there is a practical need for these neural network systems to be powered down without the loss of information content embedded in the synaptic weights. Consequently, there is a need for such simplified circuits for neural network architectures.

Various implementations of nonvolatile synaptic cells using "floating gate" technology have surfaced in the literature. (M. Holler, S. Tam, H. Castro and R. Benson, "An Electrically Trainable Artificial Neural Network (ETANN) with 10240 "Floating Gate" Synapses," preprint.) The underlying physical phenomenon for charge storage and removal relies on some form of tunneling-injection across an oxide barrier. Specialized processing techniques are required, and consequently, they are costly. Therefore they are traditionally reserved for industrial in-house research and development leading to commercial products. An example of this is Intel's ETANN chip. (Holler, et al., supra.)

The use of UV radiation for analog storage is extensively reviewed by D.A. Kerns, J.E. Tanner, M.A. Silvilotti and J. Luo, "CMOS UV-Writable No-Volatile Analog Storage," (to appear in the Proceedings of Advanced Research in VLSI: International Conference 1991, Santa Cruz, California), and it is shown that charge leakage from the floating-gate capacitance can for all practical purposes be considered to be negligible.

STATEMENT OF THE INVENTION

An object of this invention is to provide a neural network architecture centered around a multiplier circuit and an integral nonvolatile analog storage element. Yet another object is to provide, in a sandwich structure of polycrystalline silicon slabs, a floating-gate type of capacitor (integral with an integrated circuit comprised of metal-oxide-silicon (MOS) field-effect transistors) to store a charge in response to a combination of a programmed voltage and unfocused ultraviolet radiation which photo-activates electrons in the silicon conduction band of one polycrystalline slab across an oxide barrier onto another polycrystalline slab of silicon which integrates the photoelectrons.

These and other objects of the invention are achieved in VLSI MOS floating-gate-based nonvolatile analog synaptic cells that implements an X-Y array of processing synapses. Each synaptic cell is comprised of a four-quadrant analog multiplier requiring X and Y differential input voltages, where the $X_i$ input voltages for rows of the array are $V_{Xi}^+$ and $V_{Xi}^-$, where $i \leq n$ for n rows with at least one input voltage being a variable input, and the Y input voltages for columns of the array are $V_{Yj}^-$ and $V_{Yj}^-$, where $j \leq m$ for m columns with at least one UV programmed voltage stored as a charge in a floating gate, MOS field-effect transistor by integration of UV excited photoelectrons. The output current of each column of synapses, $I_{out(j)}$, is the sum of the currents in the synaptic cells of the column. The output current $I_{ij}$ of each synaptic cell in the column produced by its four-quadrant multiplier is proportional to the differential $V_{X(i)}^+ - V_{X(i)}^-$ multiplied by the differential $V_{Y(j)}^+ - V_{Y(j)}^-$.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1b is a schematic plan of components in FIG. 1a.

FIG. 2b is a complete circuit diagram of a VLSI CMOS implementation of the schematic circuit of FIG. 2a.

DETAILED DESCRIPTION OF THE INVENTION

Figure 1A:
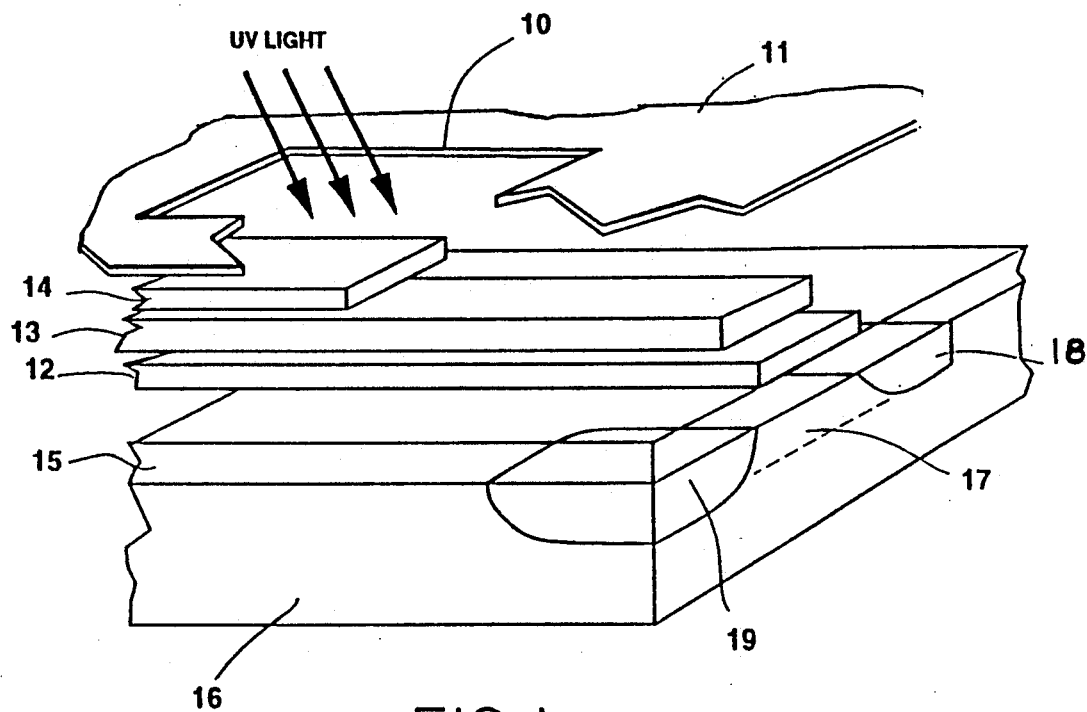
FIG. 1a illustrates a cut-away isometric view of a prior-art floating-gate, n-channel MOS transistor used as a capacitor for charge storage.

Referring to FIG. 1, which depicts a cut-away representation of a prior-art floating-gate, n-channel metal-oxide-silicon (MOS) transistor, unfocused UV radiation is flooded through an opening 10 etched in a metal mask 11. That mask is opaque to UV's. A glass layer (not shown) is applied as the topmost layer for isolation of the MOS transistor. The mask is placed over the glass layer. Through the etched openings 10 in the mask 11, the UV photons can interact with a sandwiched layer of polycrystalline (poly) silicon slab 12 (hereinafter referred to as a "floating poly gate" or "floating gate"), a layer 13 of silicon dioxide, and a polycrystalline (poly) silicon slab 14. This sandwich structure is formed by three successive epitaxial process steps over a layer 15 of silicon dioxide thermally grown on n-type silicon wafer 16. (C. Mead and L. Conway, Introduction to VLSI Systems, Addison-Welsey Publishing Company (1980), pp 38–45.) The passivating layer of glass (not shown) is deposited over the sandwich structure to isolate it from the integrated circuits to be described below.

The poly gate 12 on the $SiO_2$ layer 15 is grown over an n-type silicon channel 17 between p-type diffusion regions 18 and 19 to form a floating gate for the MOS transistor. Because of the $SiO_2$ layer 13, the floating gate 12 can store a charge created due to conduction through that oxide layer 13 over the poly gate 12 in response to an externally applied programmed voltage (V CHARGE) applied to the poly slab 14 and UV radiation. Internal source and drain connections (not shown in FIG. 1a) are provided to the diffusion regions 18 and 19 to connect the floating-gate MOS transistor 20 (FIGS. 2a and 2b) to a VLSI circuit as will be noted more fully below, and as schematically indicated in a plan shown in FIG. 1b for connection of the storage capacitor thus implemented to a programming circuit as shown in FIG. 2a or FIG. 3 and to a neural network of synaptic cells as shown in FIG. 5, which includes in each synaptic cell a four-quadrant multiplier circuit shown in FIG. 4. The squares with an X represent these connections.

The programming mechanism used to store charges in a MOS floating-gate field-effect transistor 20 in FIGS. 2a and 3 can be explained as follows. Insulators, such as silicon dioxide are characterized by an energy gap, $E_g$. For temperatures other than zero, there is a nonvanishing probability that some electrons can be thermally excited across the energy gap into the conduction band. For silicon dioxide at room temperature, the band gap is 9 eV. Since the electron conduction is proportional to the exponential factor $e^{-E_g/2kT}$, this event is extremely unlikely. The situation changes when the window 10 (FIG. 1) is illuminated with UV radiation.

When UV photons radiated through the window 10 impinge on the polysilicon sandwich structure, the radiation can excite electrons across the gap into the conduction band, resulting in conduction. The incident photons of the UV source chosen has an emission wavelength of 254 nm, corresponding to an energy of $\approx 4.8$ eV, enough to excite the more energetic electrons in the Fermi distribution across the band gap of silicon dioxide.

Figure 1B:
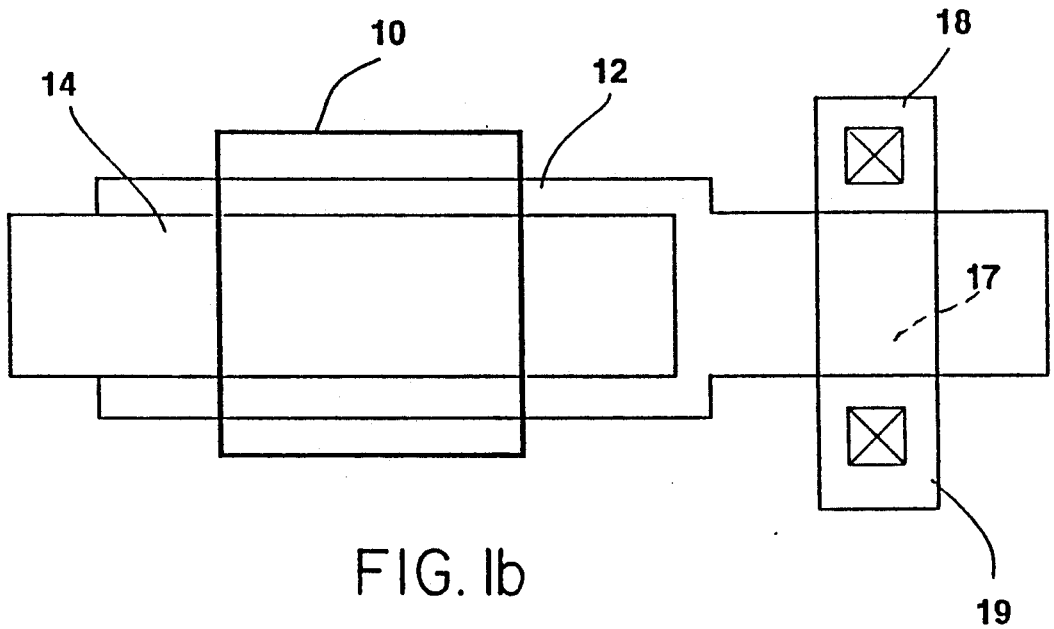
Figure 2A:
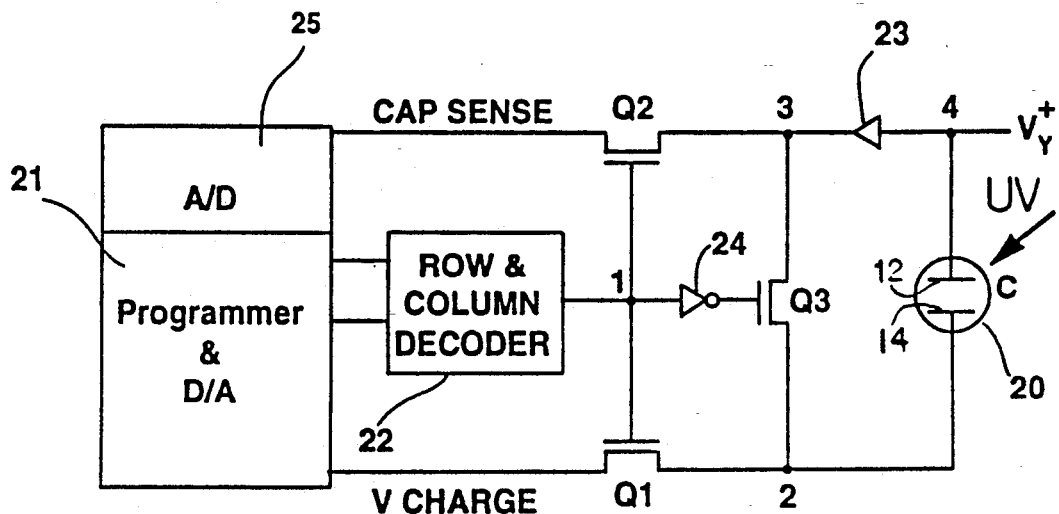
FIG. 2a is a schematic circuit diagram for sequentially programming the charge and discharge of individual floating-gate MOS transistors in an array of synaptic cells shown in FIG. 5 represented in both FIG. 2a and FIG. 5 by a conventional symbol for a capacitor but enclosed in a circle.
Figure 3:
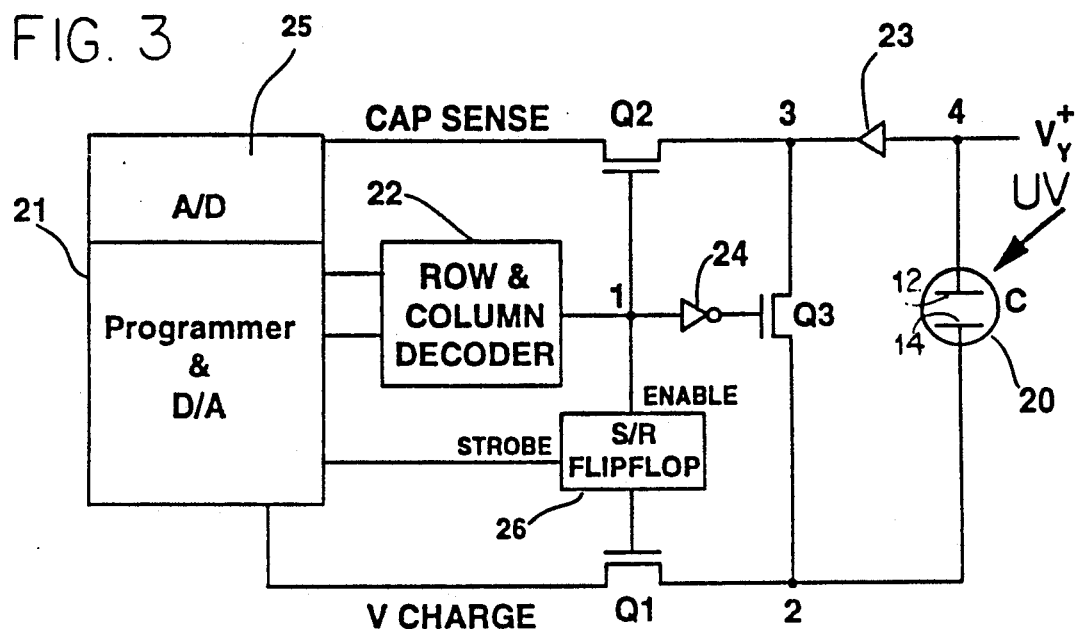
FIG. 3 is a schematic circuit diagram similar to FIG. 2a but having an architecture for programming the charge and discharge of individual floating-gate MOS transistors in an array of synaptic cells shown in FIG. 5 by enabling simultaneous charging of all floating-gate MOS transistors in response to programmed voltages and unfocused UV radiation and continuously scanning all the floating-gate MOS transistors in the array while they are being charged, and disabling individual floating-gate MOS transistors from accepting any further charge as they reach their individually programmed charge levels.

A MOS floating-gate 20 fabricated as shown in FIG. 1a is represented in FIGS. 2a and 3 by the conventional symbol for a capacitor in a circle. Since the MOS floating gate is well insulated by the $SiO_2$ sandwich structure described above, the charge stored is held with negligible leakage until intentionally discharged through a circuit path (transistor $Q_3$ in FIGS. 2a and 3) external to the MOS floating-gate field-effect transistors.

Figure 2B:
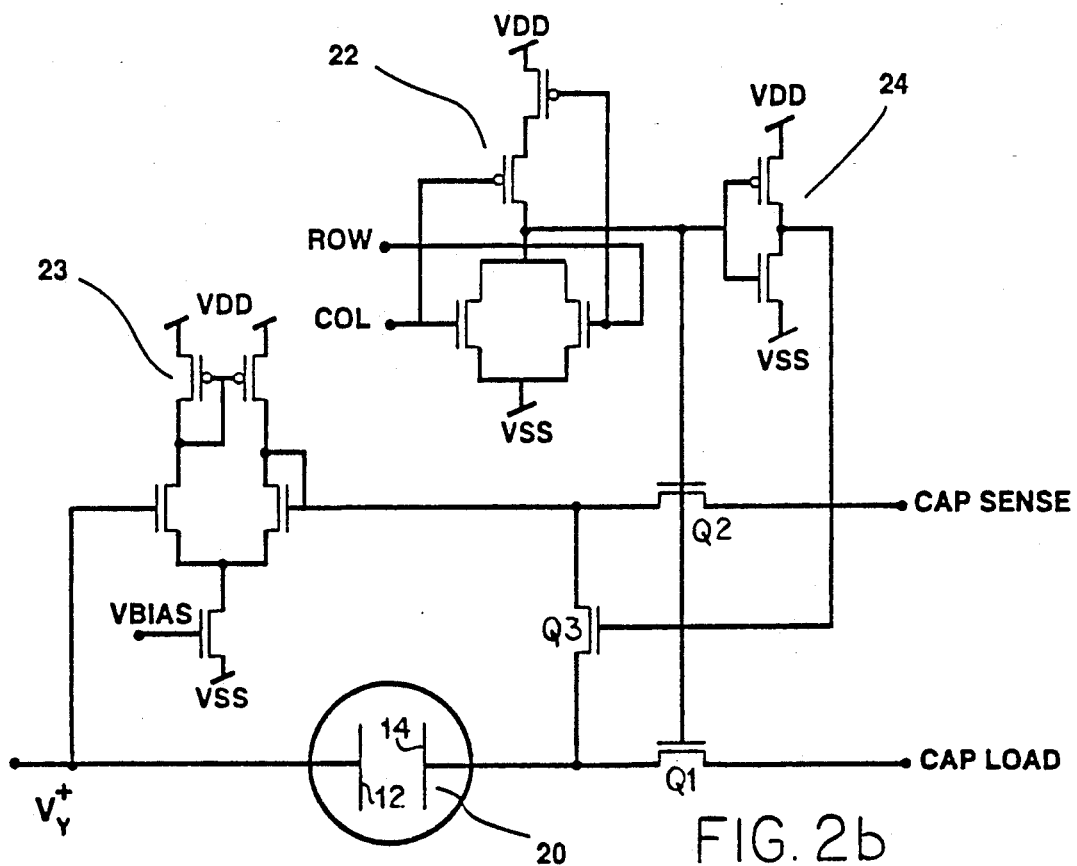

A complete circuit diagram of a VLSI CMOS implementation for the schematic diagram of FIG. 2a is shown in FIG. 2b. In operation of the circuit, a programmer 21 (implemented with, for example, a programmed personal computer) addresses each MOS floating-gate 20. Row and column address detectors 22 select a single synaptic cell MOS floating gate (one out of 1024 of a 32×32 synapse array) to place a high state voltage signal at node 1 that turns on transistors $Q_1$ and $Q_2$. The transistor $Q_1$ allows loading the charge in the MOS floating gate 20 produced in response to photons from a UV floodlight source, while transistor $Q_2$ allows the output voltage at node 4 to be sensed via a transconductance amplifier 23. Meantime, an amplifier 24 inverts the high state voltage signal to a low state voltage signal to hold a transistor $Q_3$ off.

The sensed voltage processed through an A/D converter 25 is compared with a voltage level set by the programmer 21 for the particular synaptic cell. When the floating gate 20 has charged to the programmed voltage level, the high state voltage signal at node 1 is switched to a low state voltage signal to turn off transistors $Q_1$ and $Q_2$, and turn on transistor $Q_3$ which allows the programmed output voltage to be fed back to the floating gate 12, thus preventing any further integration of electrons. The sensed programmed voltage to the programmer 21 is thus disconnected by the transistor $Q_2$ and is instead connected by the transistor $Q_3$ to the capacitor load node 2 now disconnected from the programmer 21 by the switch $Q_1$. The programmer 21 then steps to the next synaptic cell, and the process is repeated until all synapses have been programmed in sequence, one at a time.

The implementation of the circuit of FIG. 2a with VLSI CMOS technology is as shown in the circuit diagram of FIG. 2b where the nodes are identified by the same reference numerals 1 through 4, and the functional group of transistors are identified by the same numerals as used for the functional elements of FIG. 2a.

VLSI CMOS implementation and operation of the circuit shown in FIG. 3 is similar to that of FIG. 2a, except that since charging each floating gate in sequence takes a significant time, it is preferred to start charging all synaptic cell floating gates in parallel at the same time, and to stop charging each one individually as the programmed voltage level is reached for each one. For convenience, the same reference numerals are used for the same functional elements as in FIG. 2a. Transistors $Q_1$, $Q_2$ and $Q_3$ are switches that operate in the same manner, and the functional elements 21 through 25 operate in the same way. What is different is an enabled S/R-type flip-flop 26 placed in the control line of the transistor $Q_1$. Initially all flip-flops of the synaptic cells are set by an initializing set command pulse from the programmer 21, and thereafter enabled to be reset in response to a strobe pulse when the floating gate 20 has reached the programmed voltage level.

The row and address detector places a high state voltage signal at node 1 each time the programmer scans through all synapses 1 through 1024 after initialization which turns the transistor $Q_1$ on and holds it on so that the floating-gate 20 continually charges as the programmer thereafter scans through the synaptic cells, each time turning the transistor $Q_2$ on for comparing the voltage output via the transconductance amplifier 23. When the output voltage reaches the programmed level for the particular synapse, the programmer transmits a strobe pulse to all synaptic cells, but only the one S/R flip-flop of the synaptic cell being addressed at the time has its flip-flop enabled, so that only the synaptic cell having its charge voltage sensed at that point in the scan cycle is reset.

The programmer continues to scan all of the synapses until all have an output voltage that has reached their programmed level so that all have had their transistor $Q_1$ turned off. The programmer keeps track of that by counting the number of times a strobe pulse has been transmitted to the synaptic cells. When that count has reached 1024, all floating gates have been charged to their programmed voltages. It is thus apparent that the CMOS VLSI implementation of FIG. 2b may be adapted for the embodiment of FIG. 3 by simply adding the flip-flop 26. The advantage of this second embodiment is, as noted above, that all the floating gates of the synapse array are charged in parallel rather than in sequence to save programmer time.

Figure 4:
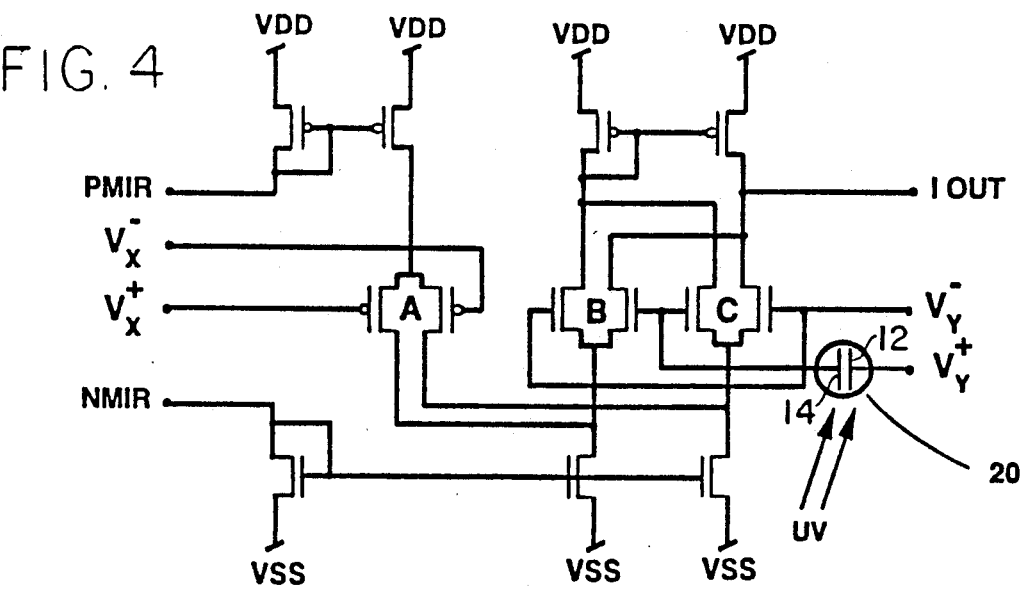
FIG. 4 is a schematic circuit diagram of a VLSI CMOS implementation of a basic synaptic cell comprising a four-quadrant differential multiplier, one of whose inputs $V_X^+$, $V_X^-$, $V_Y^+$, and $V_Y^-$ is a UV programmed charge stored in a floating-gate MOS transistor, namely $V_X^+$.
Figure 5:
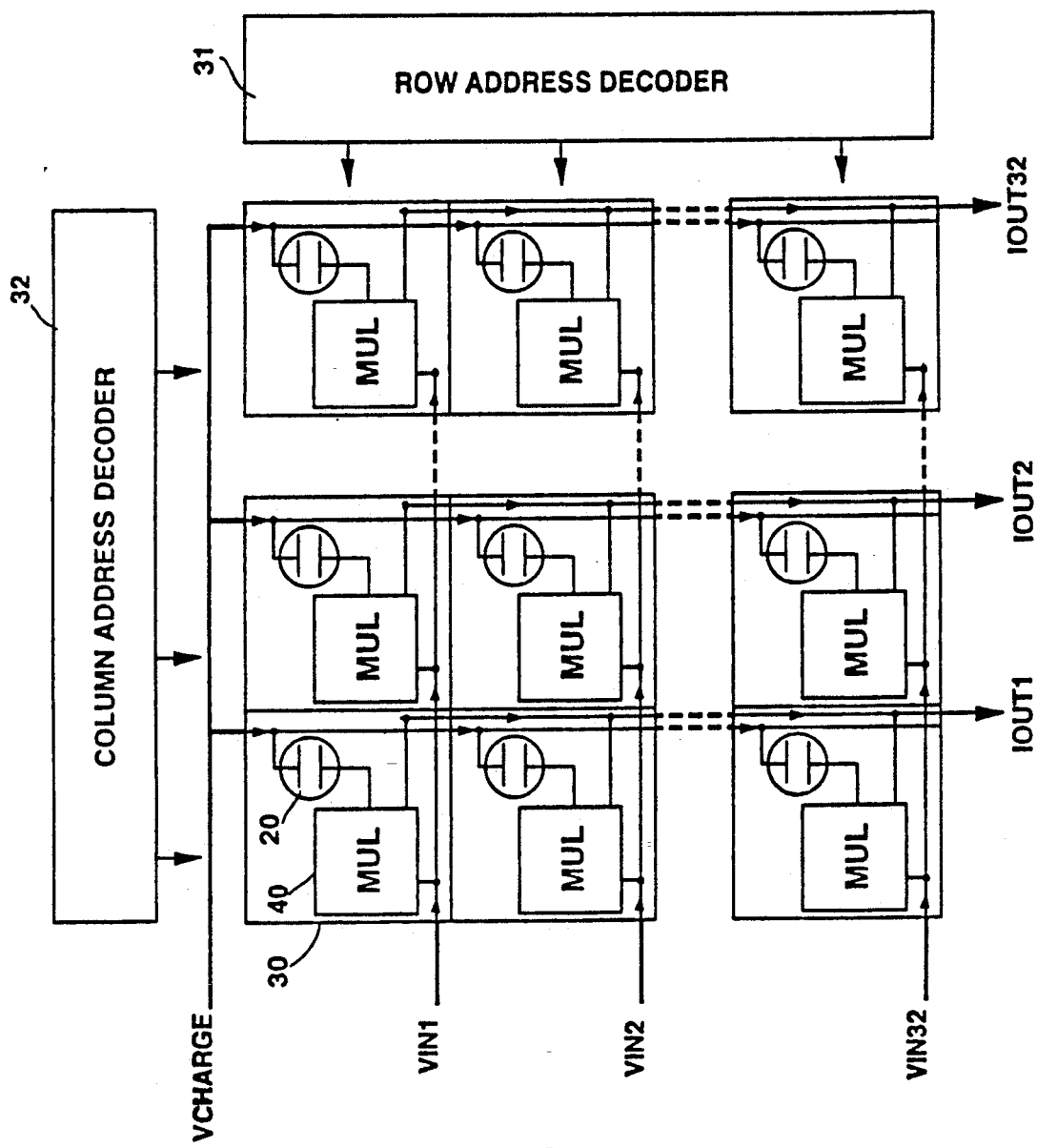
FIG. 5 is a schematic diagram of a 32×32 array of synaptic cells as shown in FIG. 4, where each comprises a four-quadrant multiplier and a floating-gate MOS transistor for storing a charge as shown in FIGS. 1a and 1b, and programmed as shown in FIG. 2a or FIG. 3. Associated row and column decoders select the synaptic cells for programming.

In the implementation of a nonvolatile 32×32 synapse array shown in FIG. 5, each synaptic cell comprises a four-quadrant differential multiplier 40 as shown in FIG. 4, one of whose inputs $V_X^+$, $V_X^-$, $V_Y^+$, and $V_Y^-$ is a UV programmed charge stored in a MOS floating gate 20, as shown in FIG. 2a or FIG. 3. The weights of the synaptic cells are to be stored as analog charges on the MOS floating gates 20 using the UV method outlined above with reference to FIGS. 2a or 3. The extensive charge retention periods associated with this charge conduction mechanism allows long storage periods, considerable simplification in the external download, and refresh circuitry if needed over extended periods of use. This is in contrast to other schemes where analog weights are stored as voltages on capacitors which are required to be continuously refreshed, such as in the capacitor refresh method of Eberhardt, et al., supra, thereby requiring an elaborate support circuitry.

In FIG. 5, each synaptic cell 30 is represented as a functional block that includes within it a MOS floating-gate symbol, again consisting of a capacitor in a circle to represent the MOS floating gate shown in FIG. 1a as used in FIGS. 2a and 3. To convert the MOS floating-gate capacitor charge into a transconductance, the four-quadrant analog multiplier 40 shown in FIG. 4 is used. A four-quadrant multiplier was chosen as the key nonlinear computational block for VLSI CMOS synaptic cells in this implementation for two reasons: it insures the existence of both excitatory and inhibitory synaptic weights, improved linearity of the multiplication, and guarantees maximum flexibility of the basic cell. The multiplier has two different pairs of voltages $V_{X(i)}^+$, $V_{X(i)}^-$ and $V_{Y(j)}^+$, $V_{Y(j)}^-$ as its inputs, and its output is a current proportional to the multiplication product $(V_{X(i)}^+ - V_{X(i)}^-) \cdot (V_{Y(j)}^+ - V_{Y(j)}^-)$.

In summary, each synapse 30 illustrated schematically in FIG. 5 consists of a multiplier 40 as shown in FIG. 4, and a UV programmable floating-gate (capacitor) having its gate connected for UV programming of the input $V_Y^+$, as shown in FIGS. 2a or 3. These synaptic cells are arranged in a fully connected 32×32 array, as shown in FIG. 5, where the thirty-two $V_{in(i)}$ terminals provide $V_{X(i)}^+$ voltage inputs to 32 rows of synapses in the array, all $V_{X(i)}^-$ inputs (not shown in FIG. 5) are tied together and can be externally biased, and all $V_{Y(j)}^-$ inputs (not shown in FIG. 5) are tied together and can be externally biased. Thus, for each row there is one variable input, $V_{in(i)}$, and for each column there is one variable output, $I_{out(j)}$. For each synaptic cell, the second voltage of the pair $V_{X(i)}^+$ and $V_{X(i)}^-$ may also be made a variable, but for simplicity, it is assumed that it is a fixed voltage set by a bias source (now shown). Similarly, the second voltage of the voltage pair $V_{Y(j)}^+$ and may also be made a variable, but for simplicity, it is assumed to be a fixed bias voltage. All $V_{Y(j)}^+$ input voltages are programmed via the MOS floating-gate (capacitor) 20 as described with reference to FIG. 2a or FIG. 3.

Thirty-two output currents $I_{out(j)}$ are provided from the multipliers of 32 columns of synaptic cells, where $I_{out(j)}$ is the sum of all multiplier output currents in the jth column, where the output current $I_{out(i,j)}$ of each synaptic cell is proportional to the differential $V_{X(i)}^+ - V_{X(i)}^-$ multiplied by the differential $V_{Y(j)}^+ - V_{Y(j)}^-$. Since $V_{X(i)}^-$ may be greater or less than $V_{X(i)}^+$ in absolute value, and $V_{Y(j)}^-$ may similarly be greater or less than $V_{Y(j)}^+$, a full four-quadrant multiplier is provided for each synapse. In operation, each synaptic cell is driven by differential voltages to provide an output current $I_{outj}$ proportional to $V_{X(i)}^+ - V_{X(i)}^-$ times $V_{Y(j)}^+ - V_{Y(j)}^-$ where $V_{Y(j)}^+$ is the programmed charge stored in the floating-gate MOS of the synaptic cell ij, where $i \leq n$, $j \leq m$, and n and m are the number of rows and columns, respectively, of the array.

The external select circuitry which comprises row and column decoders 31 and 32 allows selecting a specific synaptic cell out of the total 1024 synaptic cells for programming. When so selected, circuitry internal to the synaptic cell shown in FIG. 2a or FIG. 3 further allows for three things: (1) programming the charge of the MOS floating gate, (2) external monitoring of the floating-gate charge, and (3) disabling charge leakage from unaddressed synaptic cells during the general exposure of the array to the ultraviolet light.

The nonvolatile charge of each synaptic cell MOS floating gate 20 of the array shown in FIG. 5 is used in a four-quadrant multiplier as shown in FIG. 4. A folded Gilbert cell multiplier circuit (J.N. Babanezhad, and C.T. Gabor, "A 20-V Four Quadrant CMOS Analog Multiplier," IEEE Journal of Solid State Circuits, Vol. SC-20, No. 6, December 1985) is used so that both sets of differential inputs are symmetrical about ground potential. To obtain a reasonable dynamic range, the CMOS transistors making up the three differential pairs A, B and C were specified to be quite long (L/W ratio equal to 33). The negative mirror (NMIR) and positive mirror (PMIR) currents were biased for a current of 200 nA.

Although particular embodiments of the invention have been described and illustrated herein, it is recognized that modifications and variations may readily occur to those skilled in the art. Consequently, it is intended that the claims be interpreted to cover such modifications and equivalents.

I claim:

1. A nonvolatile programmable structure of synaptic cells in an integrated circuit array, wherein each synaptic cell fabricated in a silicon wafer comprises an integral nonvolatile analog storage element, said analog storage element comprising a sandwhich structure of two polycrystalline silicon slabs separated by a silicon dioxide barrier and a mask with an opening for flooding one of said polycrystalline slabs with ultraviolet radiation which photo-activates electrons in the silicon conduction band of one polycrystalline layer across said silicon dioxide barrier onto another of said two polycrystalline silicon slabs functioning as a floating gate, said sandwhich structure being isolated from said integrated circuit array by silicon dioxide except for conductors within said integrated circuit array for connecting said two polycrystalline silicon slabs forming a synaptic cell capacitor to an integrated circuit for control of charging said synaptic cell capacitor in response to a programmed voltage and ultraviolet radiation applied through said mask to said one polycrystalline silicon slab, and for separately connecting said two polycrystalline silicon slabs to said programmable array structure, wherein said array is arranged in a number n of X rows and a number m of Y columns, and each of said synaptic cells has a multiplier for receiving a programmed $X_i$ voltage and a programmed $X_i$ input for multiplication by a voltage $Y_{ij}$ stored in said synaptic-cell capacitor, where $i \leq n$ and $j \leq m$ to produce an output current $I_j$ of column j of synaptic cells that is the sum of all multiplier output currents of said synaptic cells in column j, said two polycrystalline slabs being separately connected to two MOS transistors, a first MOS transistor connected to one of said two polycrystalline slabe for coupling a programmed voltage to said one polycrystalline slab, and a second MOS transistor coupled by a transconductance amplifier to the other of said two polycrystalline slabs for sensing a voltage induced in said synaptic cell capacitor by integration of UV excited photoelectrons in response to said ultraviolet radiation, and including means for selectively addressing said synaptic cells by row and column number, and for each specifying a voltage charge desired to be stored therein, a source of ultraviolet radiation for inducing in said synaptic cell capacitor a charge to said programmed voltage specified for each synaptic cell, a third MOS transistor coupling an output terminal of said transconductance amplifier to said one polycrystalline silicon slab, programming means for selectively turning on said first and second MOS transistors, while turning off said third MOS transistors for charging said synaptic cell capacitor, and for turning off said first and second MOS transistors while turning on said third MOS transistor when said synaptic cell capacitor has been charged to said programmed voltage applied to said one polycrystalline silicon slab, and means for inactivating said addressing means and charging means upon completion of programming stored charges in all of said synaptic cells for operation of all cells in producing a set of stable output currents $I_j$.

2. A nonvolatile programmable array structure as defined in claim 1 wherein said programming means includes bistable means for continually holding said first transistor of each synaptic cellof said array on while said synaptic cell capacitor of all synaptic cells of said array are scanned, and strobe means for switching said bistable means of each synaptic cell from said one state to a second state when said synaptic cell capacitor has been charged to said programmed voltage applied to said one polycrystalline silicon slab.

3. A nonvolatile programmable array of synaptic cells as defined in claim 2 where said multiplier is a four-quadrant analog multiplier requiring X and Y differential input voltages, where the X input voltages for rows of the array are $V_{X(i)}{}^+$ and $V_{X(i)}{}^-$ with at least one input voltage being a variable input, and the Y input voltages for columns of the array are $V_{Y(j)}{}^+$ and $V_{Y(j)}{}^-$ with one Y input voltage being a UV programmed voltage stored as a charge in said synaptic-cell capacitor, and the output current $I_j$ of each column of synapses, $I_{out(j)}$, is the sum of the currents in synaptic cells of column j, where the output current $I_{ij}$ of each synaptic cell in row i, column j is produced by multiplication of differential voltage $(V_{X(i)}{}^+ - V_{X(i)}{}^-)$ by a differential voltage $(V_{Y(j)}{}^+ - V_{Y(j)}{}^-)$ in said four-quadrant multiplier.

* * * * *